US006986582B2

(12) United States Patent
Kobayashi

(10) Patent No.: US 6,986,582 B2
(45) Date of Patent: Jan. 17, 2006

(54) PROJECTOR

(75) Inventor: Hiroshi Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/745,582

(22) Filed: Dec. 29, 2003

(65) Prior Publication Data

US 2004/0227901 A1 Nov. 18, 2004

(30) Foreign Application Priority Data

Feb. 14, 2003 (JP) ....................................... 2003-036241

(51) Int. Cl.
*G03B 21/18* (2006.01)
*G03B 21/26* (2006.01)
*G03B 21/22* (2006.01)
*G02F 1/1335* (2006.01)

(52) U.S. Cl. ............................ 353/61; 353/58; 353/60; 353/119; 349/8; 349/161; 348/748

(58) Field of Classification Search ................. 359/237, 359/242, 244–246, 250, 251, 267, 483, 618, 359/629, 639, 640; 353/61, 52, 54, 55, 57–60, 353/20, 30, 31, 33, 34, 37, 81, 82, 85, 119; 349/5, 7, 8, 9, 80, 96, 99, 102, 103, 161; 348/742, 744, 748, 750–752, 756–759, 761, 348/762, 766, 767, 770, 771
See application file for complete search history.

(56) References Cited

U.S. PATENT DOCUMENTS 6,334,686 B1 * 1/2002 Shiraishi et al. .............. 353/57
2001/0019397 A1 * 9/2001 Shiraishi et al. .............. 353/61

FOREIGN PATENT DOCUMENTS

JP A 11-295814 10/1999

* cited by examiner

*Primary Examiner*—W. B. Perkey
*Assistant Examiner*—Rochelle Blackman
(74) *Attorney, Agent, or Firm*—Oliff & Berridge, PLC

(57) ABSTRACT

An aspect of the invention provides a duct capable of cooling optical modulation systems with high efficiency while realizing miniaturization and reduction of the mounted number of cooling fans. The duct can be used for a projector including plural optical modulation systems, a dichroic prism, and a projection lens, and the respective optical modulation systems include liquid crystal panels, entrance side polarization plates, viewing angle correction plates, and exit side polarization plates. The duct can have plural air guide paths through which cooling air passes, a discharge opening, entrance side discharge openings, and exit side discharge openings formed in these air guide paths. With the optical modulation systems as targets of independent cooling, the entrance side discharge openings and the exit side discharge openings with respect to the targets of independent cooling are formed in different air guide paths.

6 Claims, 6 Drawing Sheets

PROJECTOR

BACKGROUND OF THE INVENTION

1. Field of Invention

An aspect of the invention relates to a duct used for a projector including, for example, plural optical modulation systems for modulating plural color lights with respect to each color light according to image information to form optical images, a color composition optical system for combining the optical images modulated in the respective optical modulation systems, and a projection optical system for magnification projection of the composite optical image, and for introducing cooling air to the optical modulation systems, a cooling device, and a projector.

2. Description of Related Art

Conventionally, using a projector for a presentation in a conference, an academic conference, an exhibition, and the like is well known. Some of such projectors adopt the so-called three-plate system in which luminous flux emitted from a light source device is separated into light of three primary colors of red, green, and blue by a dichroic mirror, and the light is modulated with respect to each color light according to image information by three liquid crystal panels, and then the respective color lights after image modulation is combined by a cross dichroic prism and a color image is magnification projected via a projection lens. In the three-plate system projector, optical conversion elements, such as polarization plates for aligning polarized direction of the respective color lights to be modulated in the liquid crystal panels are provided on the luminous flux entrance side and the luminous flux exit side of the liquid crystal panel.

By the way, in the above described projector, the respective polarization plates generate heat due to application of the luminous flux from the light source device. Accordingly, in order to cool these liquid crystal panels and respective polarization plates, for example, the cooling structure as below is adopted. In other words, a cooling fan and a duct connected to the cooling fan are provided in the projector. In the duct, an entrance side air outlet for discharging cooling air to the luminous flux entrance sides of the liquid crystal panels and an exit side air outlet for discharging cooling air to the luminous flux exit sides of the liquid crystal panels are formed. By the structure, the cooling air from the cooling fan is discharged while being divided appropriately from the entrance side air outlet and the exit side air outlet, and thereby, the liquid crystal panels and the respective polarization plates can be forcibly cooled. See, for example, Publication of Japanese Patent Application No. Hei-11-295814.

SUMMARY OF THE INVENTION

Normally, since optical properties of polarization plates are different between luminous flux exit side and the luminous flux entrance side, the polarization plate on the luminous flux exit side generates a larger amount of heat than that of the polarization plate on the luminous flux entrance side. In addition, recently, a projector of higher intensity is requested, however, by the above described structure, there is a possibility that the amount of heat generated in the polarization plate on the exit side is especially increased, and the heat cannot be dissipated quickly.

In order to solve the problems, it is conceivable that improvement in cooling efficiency is facilitated by increasing the number of rotation of the cooling fan and the mounted number of cooling fans. However, it is necessary to make the size and the mounted number of cooling fans as small as possible for realizing miniaturization and lower noise of the projector.

The invention can provide a duct, a cooling device, and a projector capable of cooling optical modulation systems with high efficiency while realizing miniaturization and reduction of the mounted number of cooling fans.

An exemplary duct of the invention can be a duct used for a projector including plural optical modulation systems for modulating plural color lights with respect to each color light according to image information to form optical images, a color composition optical system for combining the optical images modulated in the respective optical modulation systems, and a projection optical system for magnification projection of the composite optical image, and for introducing cooling air to the optical modulation systems, In the duct, each of the optical modulation systems can include an optical modulation device, an entrance side optical conversion element disposed on the luminous flux entrance side of the optical modulation device, and an exit side optical conversion element disposed on the luminous flux exit side of the optical modulation device, the duct has plural air guide paths through which cooling air passes, entrance side discharge openings for discharging cooling air to the luminous flux entrance sides of the optical modulation devices, and/or exit side discharge openings for discharging cooling air to the luminous flux exit sides of the optical modulation devices, which are formed in these air guide paths, and at least one of the plural optical modulation systems is set as a target of independent cooling, and the entrance side discharge opening and the exit side discharge opening with respect to the target of independent cooling are formed in different air guide paths.

Here, as the optical modulation device, a device that includes an optical modulation element, such as a liquid crystal panel having a construction in which a drive substrate and an counter substrate formed from glass and the like are bonded with a predetermined space therebetween via a sealing material, and liquid crystal is enclosed between both substrates can be adopted.

Further, as the optical conversion element, the construction including a substrate and an optical conversion film provided on the substrate can be adopted. As the substrate, sapphire, silica glass, quartz crystal, fluorite, and the like can be used. As the optical conversion film, a polarization film, a viewing angle correction film, a phase difference film, and the like can be used.

According to an aspect of the invention, since the construction in which the luminous flux entrance side and the luminous flux exit side of the optical modulation device are cooled with cooling air that has passed through different paths, the wind speed and the air flow of the cooling air may be adjusted in response to the respective generated amounts of heat. Thereby, the luminous flux entrance side and the luminous flux exit side of the optical modulation device can be cooled on more suitable conditions, respectively, compared to the case of applying cooling air from the same path, and thus, the optical modulation systems can be cooled with high efficiency while realizing miniaturization and reduction of the mounted number of cooling fans.

Specifically, in the case of a projector that adopts the three-plate system for separating luminous flux from a light source lamp into respective color lights of R (red), G (green), and B (blue) and perform modulation with respect to each color light by three optical modulation devices, the optical modulation systems of G and B especially generate larger amounts of heat than the optical modulation system of R due to characteristics of the light source lamp. On this account, as the target of independent cooling, optical modulation systems of G and B are preferable.

In the invention, it is preferred that the exit side discharge opening is formed in a position for cooling the optical modulation device and the exit side optical conversion element.

According to an aspect of the invention, not only the optical modulation device, but also the exit side optical conversion elements that generate a larger amount of heat can be cooled by the cooling air discharged from the exit side discharge opening, and thereby, cooling efficiency can be made better.

In the invention, it is preferred that the entrance side discharge opening and the exit side discharge opening with respect to at least one of optical modulation systems other than the target of independent cooling are formed in the same air guide path.

As described above, according to an aspect of the invention, the structure of the duct can be simplified by providing the entrance side discharge opening and the exit side discharge opening with respect to the optical modulation system that generates a smaller amount of heat than the target of independent cooling in the same air guide path. For example, in the case of the above described three-plate system projector, it is preferred that the entrance side discharge opening and the exit side discharge opening with respect to the optical modulation system of R that generates a smaller amount of heat than the optical modulation systems of G and B are provided in the same air guide path.

In an aspect of the invention, it is preferred that an extending direction of the optical modulation system is disposed substantially orthogonal to an extending direction of the air guide path, and at least one of the respective discharge openings is formed on a plane along the extending direction of the air guide path in a position offset to an upstream side of an intersection of the extending direction of the optical modulation system and the air guide path so that the optical modulation system may be located in a discharge direction of cooling air from the discharge opening.

The cooling air that has traveled in the air guide path along the extending direction is discharged from the discharge opening. However, according to the law of inertia, discharged not in a direction substantially orthogonal to the discharge opening, but in a direction rather near the downstream side in the air guide path. Therefore, according to the invention, since the discharge opening is formed offset to the upstream side of the air guide path, the cooling air from the discharge opening is assured in contact with the optical modulation system, and thereby, the optical modulation system can be cooled smoothly.

An exemplary cooling device of the invention can include any one of above described ducts and plural cooling fans for sending cooling air to the respective air guide paths of the duct. According to the invention, the operation and effect substantially the same as those of the above described ducts can be exerted.

In an aspect of the invention, it is preferred that an exit side cooling fan of the cooling fans for sending cooling air to the air guide path in which the exit side discharge opening of the target of independent cooling is formed sends a larger amount of air than that of an entrance side cooling fan for sending cooling air to the air guide path in which the entrance side discharge opening of the target of independent cooling is formed. As described above, normally, the exit side optical conversion element generates a larger amount of heat than the entrance side optical conversion element. On this account, according to the invention, the exit side cooling fan with higher cooling capability than the entrance side cooling fan is used, and thereby, each optical conversion element can quickly be cooled.

An exemplary projector of the invention can include plural optical modulation systems for modulating plural color lights with respect to each color light according to image information to form optical images, a color composition optical system for combining the optical images modulated in the respective optical modulation systems, and a projection optical system for magnification projection of the composite optical image. The projector can include any one of the above described cooling devices. According to the invention, the operation and effect substantially the same as those of the above described ducts can be exerted.

In an aspect of the invention, it is preferred that the projector further includes an exterior housing for accommodating the optical modulation systems, the color composition optical system, and the projection optical system, wherein the number of the cooling fans is set to two, and air intake ports of these cooling fans are formed on two different surfaces of the exterior housing. According to the invention, since the cooling air outside the projector is introduced into the respective cooling fans from the two different surfaces of the exterior housing, the cooling air can be introduced into the optical modulation systems smoothly to further improve cooling efficiency.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
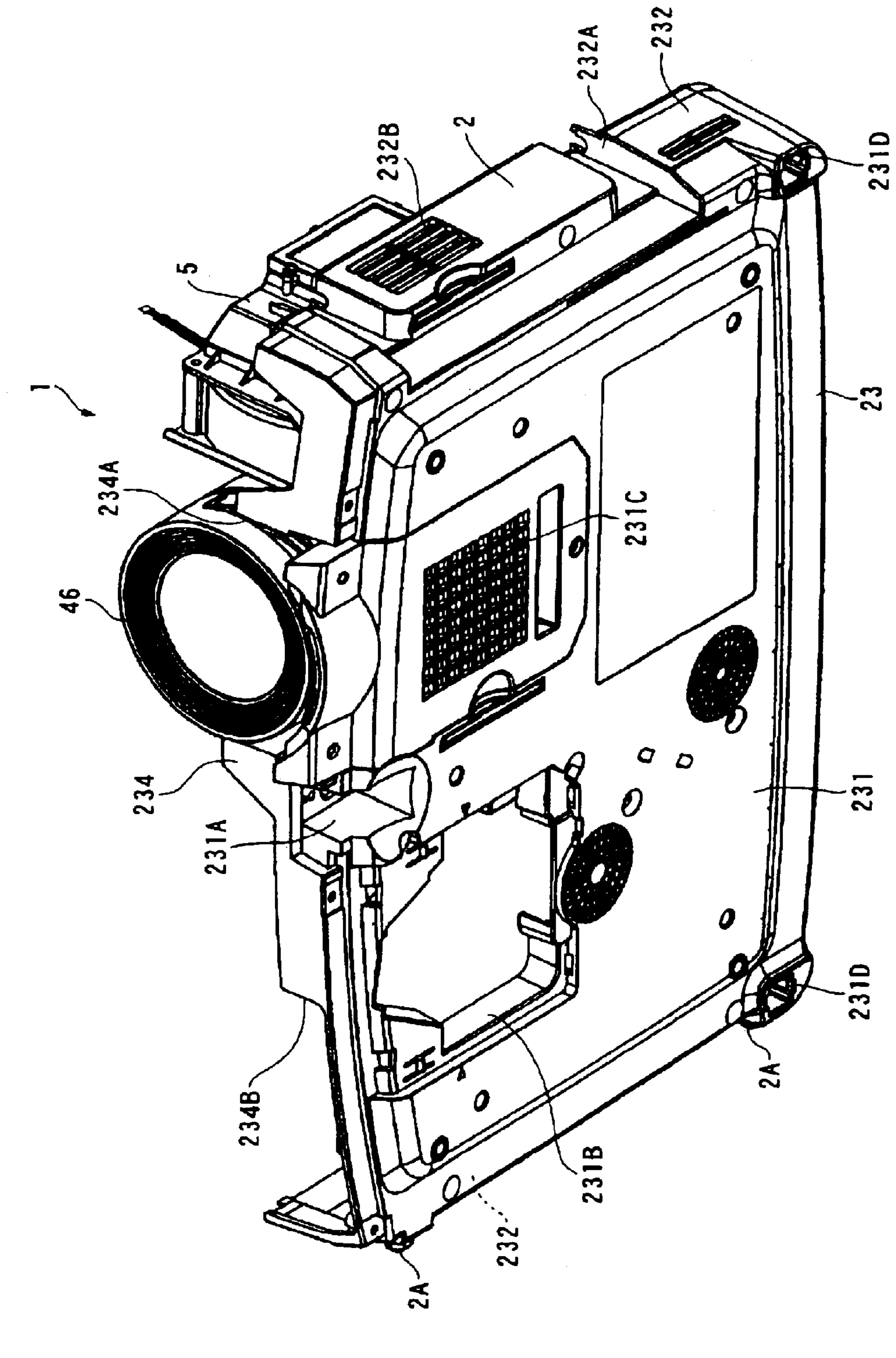
FIG. 1 shows a perspective view showing the interior of a projector according to one embodiment of the invention.

Hereinafter, one exemplary embodiment of the invention will be described by referring to the drawings.

Figure 2:
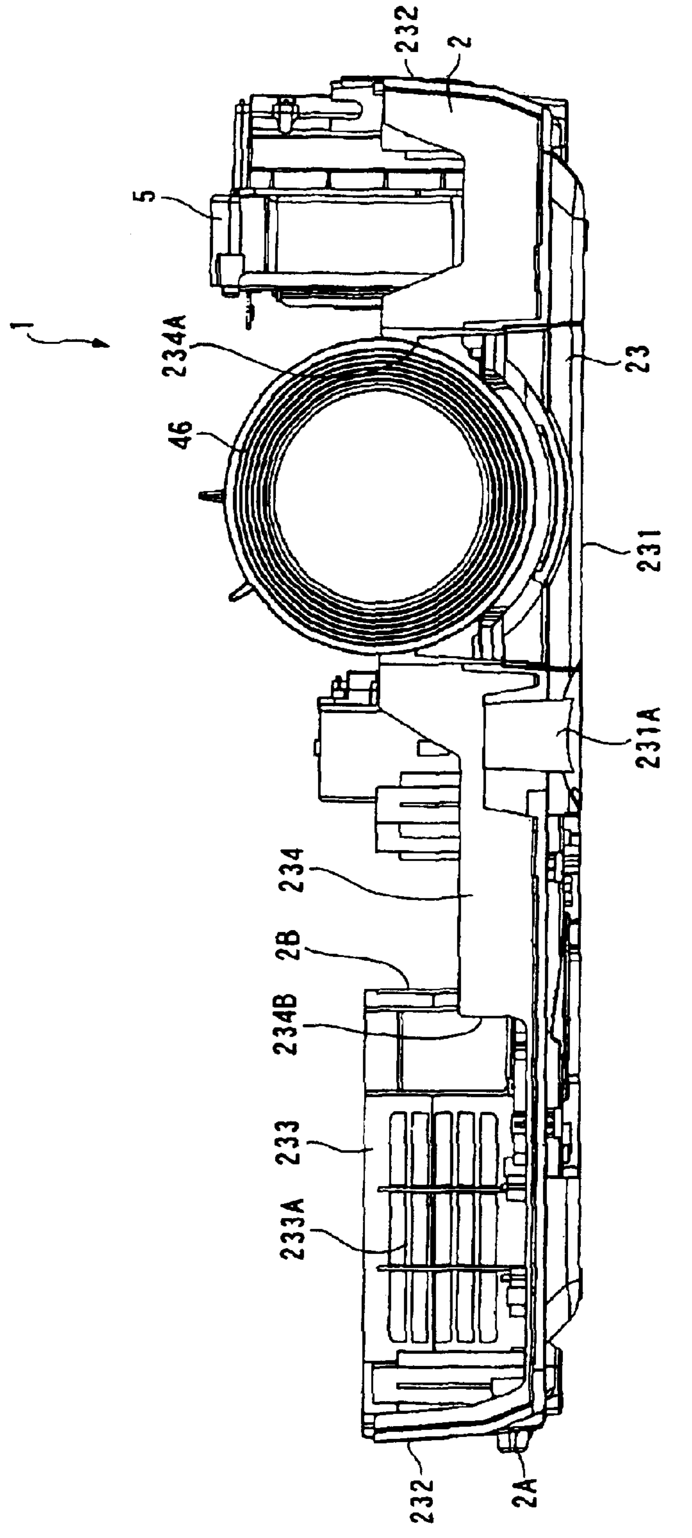
FIG. 2 shows a front view of the projector in the condition of FIG. 1.
Figure 3:
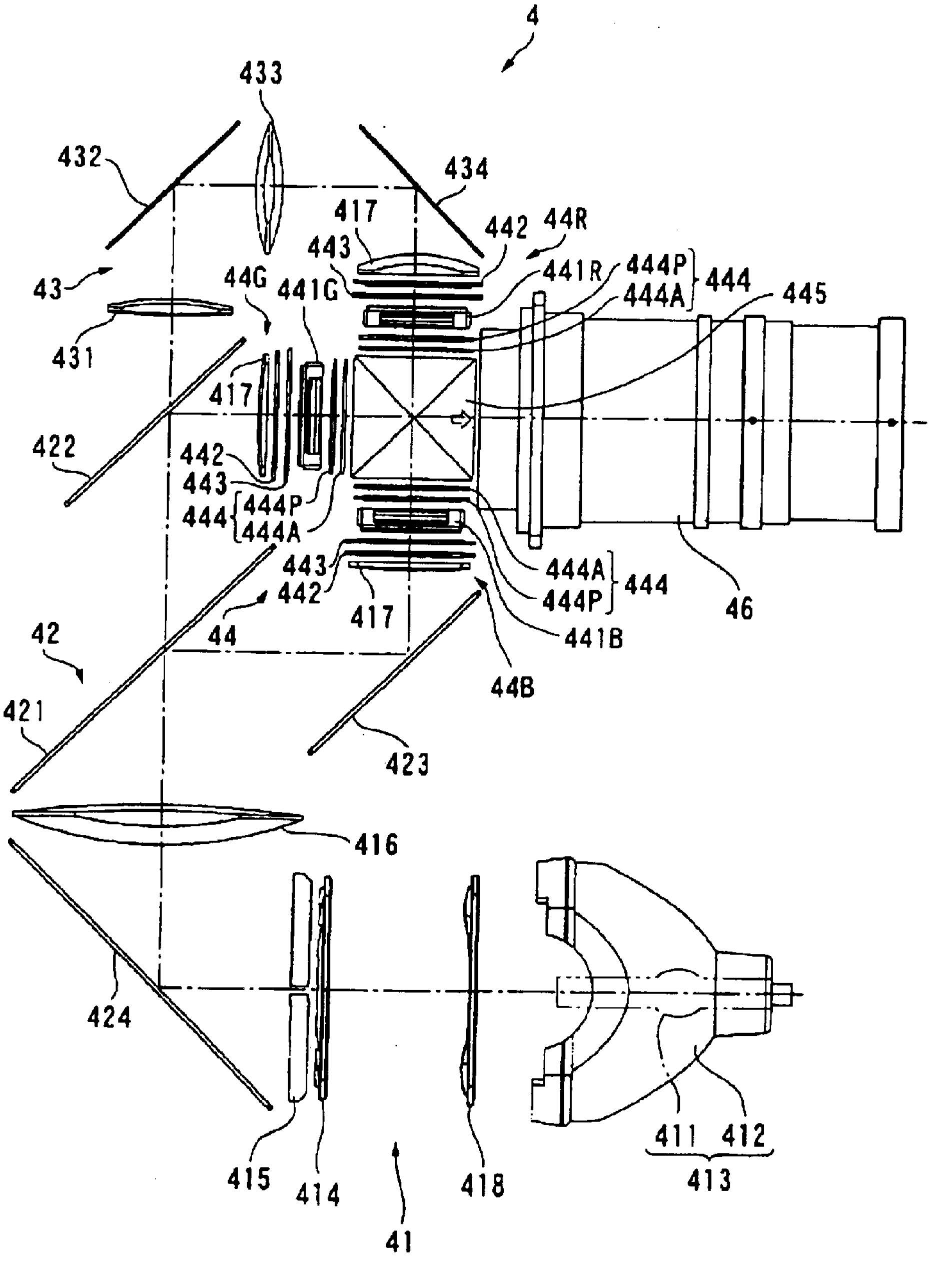
FIG. 3 shows a plan view schematically showing an optical system within an optical unit according to the embodiment.

FIG. 1 is a perspective view from below of a projector 1 according to the exemplary embodiment. Specifically, the drawing shows that a projection lens 46 and an internal cooling unit 5 are mounted to a lower case 23 of the projector 1. FIG. 2 is a front view of the projector 1 in the condition of FIG. 1. FIG. 3 is a plan view schematically showing an optical system within an optical unit 4. Note that these components 4, 5, 23, and 46 constituting the projector will be described later in detail.

In FIGS. 1 to 3, the projector 1 can include an exterior case 2 as an exterior housing, a power supply unit (not shown) accommodated within the exterior case 2, the optical unit 4 arranged in the U-shape similarly disposed within the exterior case 2, and the internal cooling unit 5 similarly disposed within the exterior case 2, and has the form of a substantially rectangular parallelepiped as a whole.

Here, the power supply unit can include a power supply for supplying power to a lamp drive circuit, a driver board, etc. and the lamp drive circuit (ballast) for supplying power to a light source lamp 411 of the optical unit 4. Further, the driver board is for controlling to drive liquid crystal panels 441, which will be described later, according to image information.

The exterior case 2 includes an upper case (not shown) and the lower case 23, which are made of resin, respectively, and they are fixed to each other with screws. Note that the lower case 23 is not necessarily made of resin, but may be made of metal.

The lower case 23 is for mounting and fixing the above described power supply unit, the optical unit 4, and the internal cooling unit 5 thereto, and formed by a bottom face 231, side faces 232 provided on the circumference thereof, a rear face 233, and a front face 234.

Substantially at the forward center of the bottom face 231, a position adjustment mechanism mounting portion 231A for mounting a position adjustment mechanism for registration of projected images by adjusting the entire tilt of the projector 1 is provided. In addition, on the forward left side of the bottom face 231 in FIG. 1, an opening for lamp cover 231B to which a lamp cover is detachably attached is formed. Moreover, on the forward right side of the bottom face 231 in FIG. 1, an air intake port 231C for cooling air is formed. Further, on two corners rearward of the bottom face 231, rear foot mounting portions 231D for fitting rear feet are formed.

In the front face 234, a notch portion 234A for supporting the projection lens 46 as a projection optical system is formed. This projection lens 46 has a top face portion exposed from the upper case, and the zoom operation and focusing operation of the projection lens 46 can be manually performed via a lever.

In the front face 234, on the opposite side to the notch portion 234A, an exhaust port mounting portion 234B for mounting an exhaust port for exhausting air via the internal cooling unit 5 is formed. The exhaust port mounting portion 234B is located forward of the internal power supply unit.

In the side faces 232, a handle mounting portion 232A for mounting a C-shaped handle rotatably on one side face (on the right side in FIG. 1). Further, on the other side face (on the left side in FIG. 1), side feet 2A (see FIG. 2) as feet in the case the projector 1 is stood vertically with the handle on the upper side.

In addition, in the part surrounded by the handle mounting portion 232A, an air intake port 232B for cooling air is formed. That is, the air intake port 231C and the air intake port 232B are formed on the bottom face 231 and the side face 232 as two different surfaces of the exterior case 2.

The rear face 233 has an interface portion 2B for mounting an interface cover formed therein, as shown in FIG. 2. On the left side in FIG. 2 of the interface portion 2B, an air intake port 233A located rearward of the internal power supply unit is formed.

The optical unit 4 is a unit that forms an optical image corresponding to image information by optically processing the luminous flux emitted from the light source lamp 411 as shown in FIG. 3. This optical unit 4 can include an integrator illumination optical system 41, a color separation optical system 42, a relay optical system 43, an optical device 44, and a projection lens 46.

The internal cooling unit 5 intakes external cooling air and introduces the air into the projector 1 to cool the internal heat generating members and exhaust warmed air to the outside.

This interior cooling unit 5 can include, other than a panel cooling device 50 as a cooling unit for cooling mainly the optical device 44 of the optical unit 4, though not shown in the drawing, a lamp cooling sirocco fan for cooling mainly the light source lamp 411, an axial-flow fan for intaking external cooling air and sending air to the power supply unit, and an exhaust sirocco fan for exhausting the air within the projector 1 to the outside.

These power supply unit, optical unit 4, and internal cooling unit 5 have their surroundings including top and bottom covered by a shield plate of aluminum (not shown), and thereby, the leakage of electromagnetic noise from the power supply unit etc. to the outside is prevented.

In FIG. 3, the integrator illumination optical system 41 is an optical system for illuminating image forming regions of the three liquid crystal panels 441 (represented by liquid panels 441R, 441G, and 441B for each color light of red, green, and blue, respectively) configuring the optical device 44 nearly uniformly, and includes a light source device 413, a first lens array 418, a second lens array 414 including a UV filter, a polarization conversion element 415, a superposition lens 416, and a reflecting mirror 424.

Of these, the light source device 413 has the light source lamp 411 as a light radiation source that emits a radial ray and a reflector 412 for reflecting radiated light emitted from the light source lamp 411. As the light source lamp 411, a halogen lamp, a metal halide lamp, or a high-pressure mercury lamp is often used. As the reflector 412, a parabolic mirror is used. Other than the parabolic mirror, an ellipsoidal mirror may be used with a collimator lens (concave lens).

The first lens array 418 has a construction in which small lenses having nearly rectangular outlines seen from an optical axis direction are arranged in a matrix form. The respective small lenses divide luminous flux emitted from the light source lamp 411 into plural pieces of partial luminous flux. The outline form of the small lens is set so as to be a nearly similar form to the form of image forming region of the liquid crystal panels 441.

The second lens array 414 has a construction substantially similar to the first lens array 418, in which small lenses are arranged in a matrix form. The second lens array 414 has a function of forming images of the respective small lenses of the first lens array 418 on the liquid crystal panels 441R, 441G, and 441B together with the superposition lens 416.

The polarization conversion element 415 is disposed between the second lens array 414 and the superposition lens 416, and integrated with the second lens array 414 into a unit. Such polarization conversion element 415 is for converting the light from the second lens array 414 into one kind of polarized light, and thereby, utilization efficiency of light in the optical device 44 is improved.

Specifically, the respective pieces of partial light converted into one kind of polarized light by the polarization conversion element 415 are nearly superposed on the liquid crystal panels 441R, 441G, and 441B of the optical device 44 finally by the superposition lens 416. In the projector using liquid crystal panels of type of modulating polarized light, only one kind of polarized light can be used, and thus, nearly the half of light from the light source lamp 411 for emitting random polarized light can not be used.

Accordingly, by using the polarization conversion element 415, emitted light from the light source lamp 411 is converted into nearly one kind of polarized light to improve utilization efficiency of light in the optical device 44. By the way, such polarization conversion element 415 is referred to, for example, in Publication of JP-A-8-304739.

The color separation optical system 42 can include two dichroic mirrors 421 and 422 and reflecting mirrors 423 and 424, and can separate the plural pieces of partial luminous flux emitted from the integrator illumination optical system 41 into color light of three colors of red, green, and blue by the dichroic mirrors 421 and 422.

The relay optical system 43 includes an entrance side lens 431, a relay lens 433, and reflecting mirrors 432 and 434, and has a function of guiding the separated color light in the color separation optical system 42 and the red light to the liquid crystal panel 441R.

At that time, in the dichroic mirror 421 of the color separation optical system 42, a red light component and a green light component of the luminous flux emitted from the integrator illumination optical system 41 are transmitted, and a blue light component is reflected. The blue light component reflected by the dichroic mirror 421 is reflected by the reflecting mirror 423, passes through a field lens 417, and, after a polarized direction thereof is aligned by an entrance side polarization plate 442, reaches the liquid crystal panel 441B for blue. This field lens 417 converts the respective pieces of partial luminous flux emitted from the second lens array 414 into luminous flux parallel to the central axis (principal ray) thereof. Field lenses 417 provided on the light entrance sides of other liquid crystal panels 441R and 441G are the same.

Of the red light and the green light transmitted through the dichroic mirror 421, the green light is reflected by the dichroic mirror 422, passes through the field lens 417, and, after a polarized direction thereof is aligned by the entrance side polarization plate 442, reaches the liquid crystal panel 441G for green. On the other hand, the red light is transmitted through the dichroic mirror 422, passes through the relay optical system 43, and further passes the field lens 417, and, after a polarized direction thereof is aligned by the entrance side polarization plate 442, reaches the liquid crystal panel 441R for red.

Note that the relay optical system 43 is used for red light in order to prevent the reduction of the utilization efficiency of light due to diffusion of light and the like because the length of the optical path of the red light is longer than the optical path lengths of other color light. That is, so that the partial luminous flux that has entered the entrance side lens 431 may be sent to the field lens 417 without change. By the way, the construction for transmitting red light of the three color lights is adopted to the relay optical system 43, however, not limited to that, for example, a construction for transmitting blue light may be adopted.

The optical device 44 is for forming a color image by modulating the entering luminous flux according to image information, and includes three optical modulation systems 44R, 44G, and 44B into which the respective color lights separated in the color separation optical system 42 enters and a cross dichroic prism 445 as a color composition optical system for combining optical images modulated in the respective optical modulation systems 44R, 44G, and 44B.

The respective optical modulation systems 44R, 44G, and 44B include the liquid crystal panels 441R, 441G, and 441B as optical modulation devices, the entrance side polarization plates 442 and viewing angle correction plates 443 as entrance side optical conversion elements disposed on the luminous flux entrance sides of these liquid crystal panels 441R, 441G, and 441B, and exit side polarized plates 444 as exit side optical conversion elements disposed on the luminous flux exit sides of these liquid crystal panels 441R, 441G, and 441B.

The liquid crystal panels 441R, 441G, and 441B use polysilicon TFTs as switching elements, and, though omitted to be shown, constructed by enclosing and sealing liquid crystal within a pair of oppositely disposed transparent substrates.

The entrance side polarization plates 442 disposed in front stages of such liquid crystal panels 441R, 441G, and 441B arc for transmitting the polarized light in a fixed direction of the respective color lights separated in the color separation optical system 42 and absorbing other luminous flux, and has substrates of sapphire glass etc. to which polarization films are attached. Alternatively, without using substrates, the polarization films may be attached to the field lenses 417.

The viewing angle correction plate 443 has an optical conversion film having a function of correcting viewing angles of the optical images formed in the liquid crystal panels 441R, 441G, and 441B of the optical modulation systems 44R, 44G, and 44B formed on substrates, and by disposing such viewing angle correction plates 443, the viewing angle of a projected image is enlarged and the contrast of the projected image is largely improved.

The exit side polarization plate 444 is for transmitting only the polarized light in a predetermined direction of the luminous flux optically modulated in the liquid crystal panels 441R, 441G, and 441B and absorbing other luminous flux, and, in the example, the plate includes two plates of a first polarization plate (pre-polarizer) 444P and a second polarization plate (analyzer) 444A. The exit side polarization plate 444 is thus constituted by two plates because the entering polarized light is absorbed by the respective first polarization plate 444P and second polarization plate 444A while being divided appropriately, and thereby, the heat generated by the polarized light is divided appropriately by both polarization plates 444P and 444A to prevent overheating of the respective plates.

The cross dichroic prism 445 is for forming a color image by combining optical images emitted from the exit side polarization plates 444. In the cross dichroic prism 445, a dielectric multi-layer film for reflecting red light and a dielectric multi-layer film for reflecting blue light are provided substantially in an X-shape along the interfaces of four rectangular prisms, and the three color lights are combined by these dielectric multi-layer films. Then, the color image combined in the cross dichroic prism 445 is emitted from the projection lens 46 and magnification projected onto a screen.

The above described liquid crystal panels 441R, 441G, and 441B, the viewing angle correction plates 443, the first polarization plates 444P and the second polarization plates 444A are fixed to luminous flux entrance end surfaces of the cross dichroic prism 445 via panel fixing plates, which are not shown.

The above described respective optical systems 41 to 44 and 46 are accommodated in a housing for optical components (not shown) made of synthetic resin as a housing for optical components arranged substantially in the U-shape in a plan view.

Figure 4:
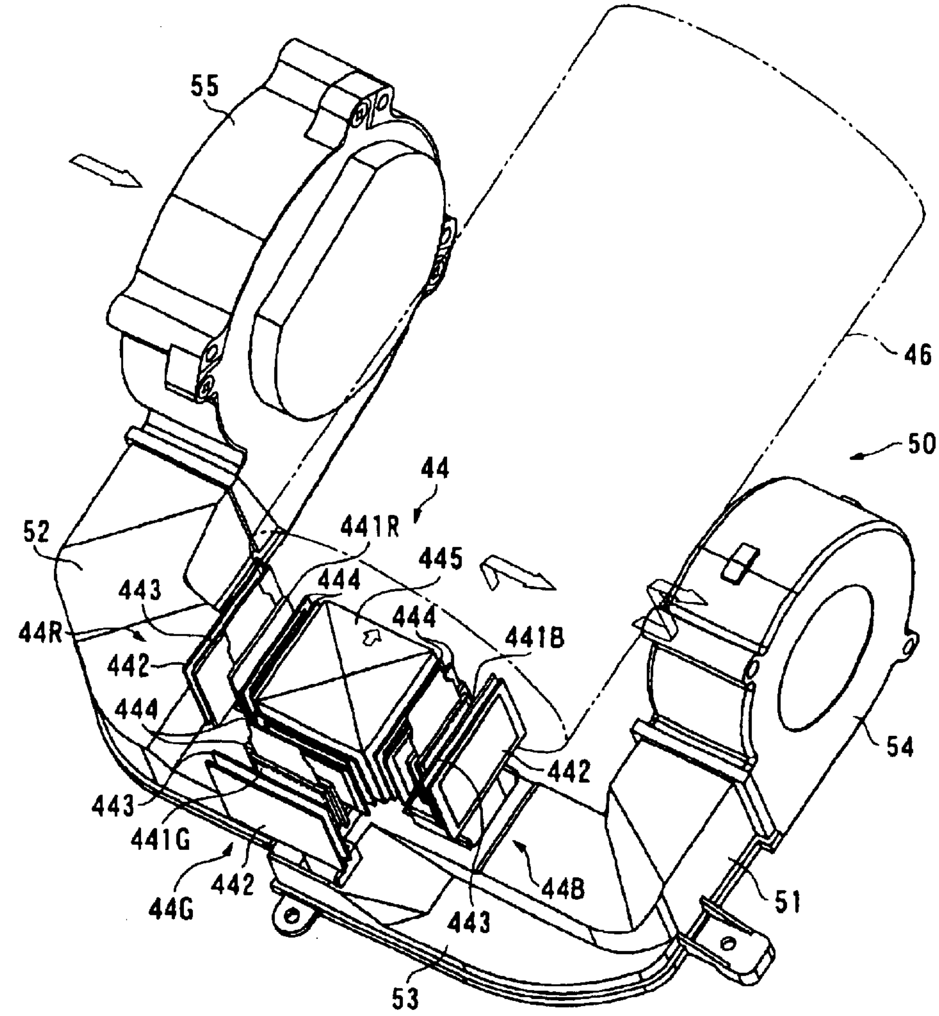
FIG. 4 shows a perspective view showing the positional relationship between a cooling device and an optical device according to the embodiment.
Figure 5:
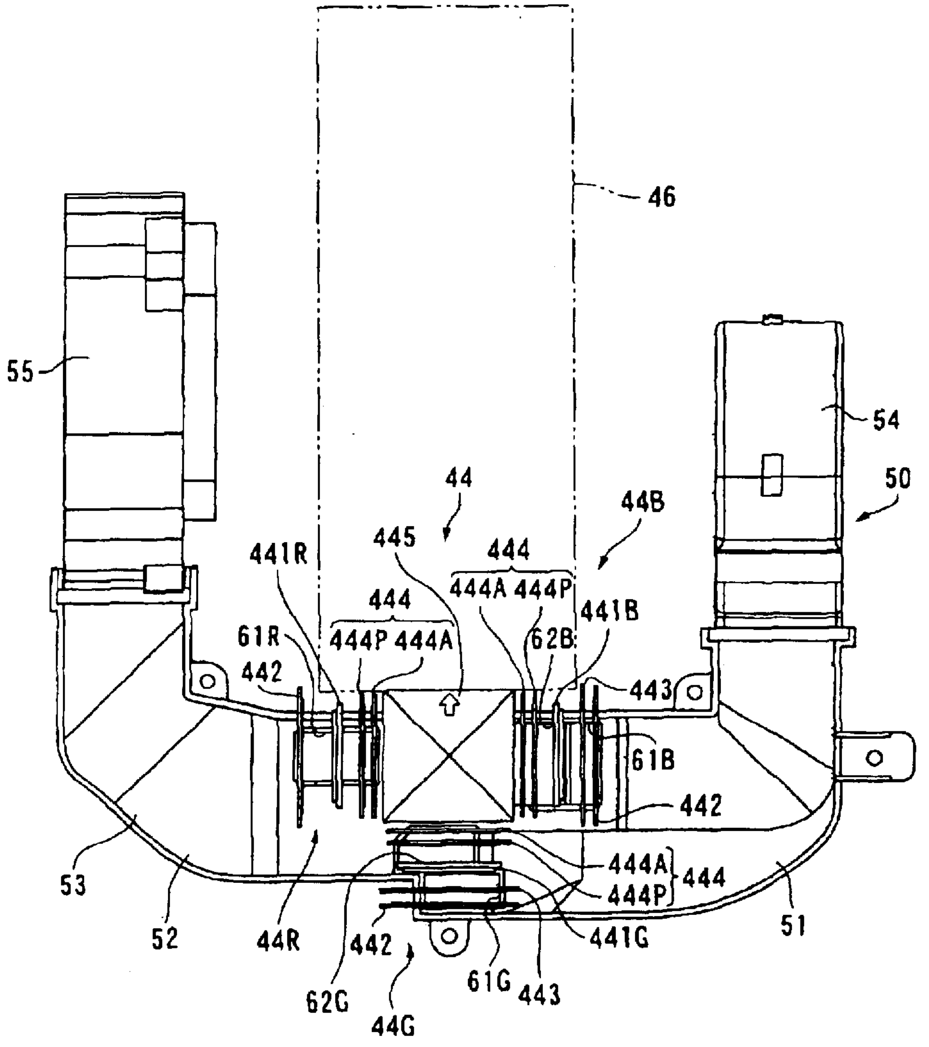
FIG. 5 shows a plan view showing the positional relationship between the cooling device and the optical device according to the embodiment.
Figure 6:
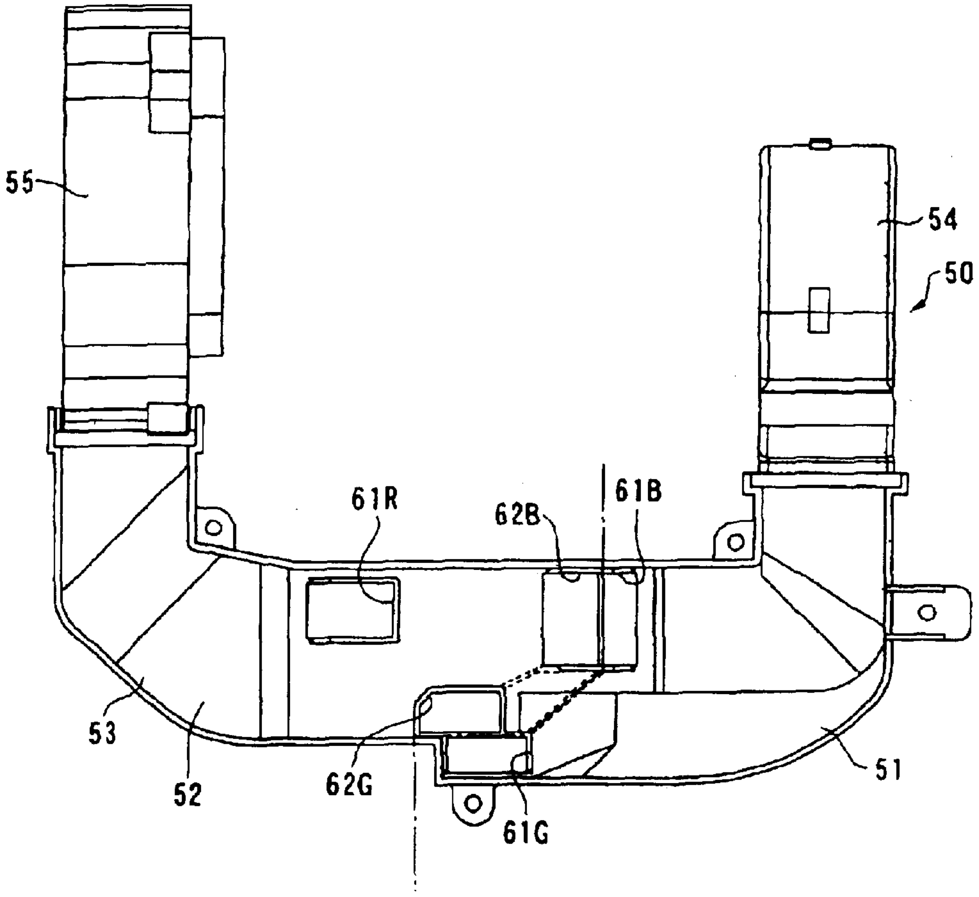
FIG. 6 shows a plan view of the cooling device according to the embodiment.

FIGS. 4 and 5 are a perspective view and a plan view showing the positional relationship between a panel cooling device 50 and the optical device 44. FIG. 6 is a plan view of the panel cooling device 50. The panel cooling device 50 is for introducing cooling air into the optical modulation systems 44R, 44G, and 44B, and includes a duct 53 having two air guide paths 51 and 52 through which cooling air passes and sirocco fans 54 and 55 as two cooling fans for sending cooling air to the respective air guide paths 51 and 52.

The duct 53 is integrally formed from synthetic resin substantially in the U-shape extending along the bottom face 231 of the lower case 23 and disposed below the optical unit 4. This duct 53 is divided into the air guide path 51 and the air guide path 52 substantially at the center thereof as shown in FIG. 6 by a dashed line. That is, the air guide path 51 extends from below the dichroic prism 445 constituting the optical unit to the right side of the projection lens 46 in FIG.

6 substantially in the L-shape. The air guide path 52 extends from below the dichroic prism 445 to the left side of the projection lens 46 in FIG. 6 substantially in the L-shape. Thereby, the extending directions of the air guide paths 51 and 52 are substantially orthogonal to the extending directions of the optical modulation systems 44R, 44G, and 44B.

Here, in the air guide path 51, entrance side discharge openings 61G and 61B that discharge cooling air to the luminous flux entrance sides of the liquid crystal panels 441G and 441B of the light modulation systems 44G and 44B are formed. Further, in the air guide path 52, exit side discharge openings 62G and 62B for discharging cooling air to the luminous flux exit sides of the liquid crystal panels 441G and 441B of the light modulation systems 44G and 44B are formed.

Thereby, in the light modulation systems 44G and 44B, the entrance side discharge openings 61G and 61B and the exit side discharge openings 62G and 62B are formed in the different air guide paths 51 and 52, and the luminous flux entrance sides and the luminous flux exit sides of the liquid crystal panels 441G and 441B are set as the targets of independent cooling to be independently cooled, respectively.

In addition, in the air guide path 52, a discharge opening 61R can be formed in which an entrance side discharge opening for discharging cooling air to the luminous flux entrance side of the liquid crystal panel 441R of the optical modulation system 44R and an exit side discharge opening for discharging cooling air to the luminous flux exit side thereof are integrated. Thereby, in the optical modulation system 44R, the entrance side discharge opening and the exit side discharge opening thereof (i.e., the discharge opening 61R) are formed in the same air guide path 52 and not set as the targets of independent cooling.

The respective entrance side discharge openings 61G and 61B are formed in positions for cooling luminous flux entrance surfaces of the liquid crystal panels 441G and 441B, the viewing angle correction plates 443, and the entrance side polarization plates 442.

Specifically, the entrance side discharge opening 61G can be formed in a position offset to the upstream side of the air guide path 51 than the intersection of the extending direction of the optical components 441G, 443, and 442 and the air guide path 51 on a plane along the extending direction of the air guide path 51. This is because, since the cooling air within the air guide path 51 is discharged in a direction rather near the downstream side from the entrance side discharge opening 61G according to the law of inertia, the optical components 441G, 443, and 442 are located in the discharge direction of the cooling air.

The entrance side discharge opening 61B is formed at the intersection of the extending direction of the optical components 441B, 443, and 442 and the air guide path 51 on a plane along the extending direction of the air guide path 51.

The respective exit side discharge openings 62G and 62B are formed in positions for cooling luminous flux exit surfaces of the liquid crystal panels 441G and 441B and the exit side polarization plates 444.

Specifically, the exit side discharge opening 62G is formed in a position offset to the upstream side of the air guide path 52 than the intersection of the extending direction of the optical components 441G and 444 and the air guide path 52 on a plane along the extending direction of the air guide path 52 for the same reason as that for the entrance side discharge opening 61G.

The exit side discharge opening 62B is formed at the intersection of the extending direction of the optical components 441B and 444 and the air guide path 52 on a plane along the extending direction of the air guide path 52.

The discharge opening 61R is formed in a position for cooling a luminous flux entrance surface of the liquid crystal panel 441R, the viewing angle correction plate 443, and the entrance side polarization plate 442 on its luminous flux entrance side, and a luminous flux exit surface of the liquid crystal panel 441R and the exit side polarization plate 444 on its luminous flux exit side.

Specifically, the discharge opening 61R is formed at the intersection of the extending directions of the optical components 441R, 442, and 444 and the air guide path 52 on a plane along the extending direction of the air guide path 52.

The sirocco fan 54 is disposed on the right side of the projection lens in FIG. 6, and introduces cooling air from the air intake port 231C formed on the bottom face 231 of the lower case 23 through the lower surface and the side surfaces of the projection lens 46 into the air guide path 51. The sirocco fan 54 is used as an entrance side cooling fan for sending cooling air to the air guide path 51 in which the entrance side discharge openings 61G and 61B of the optical modulation systems 44G and 44B as the targets of independent cooling are formed.

The sirocco fan 55 is larger scaled and sends a larger amount of air than the sirocco fan 54, disposed on the left side of the projection lens in FIG. 6 along the side face 232 of the lower case 23, and introduces cooling air from the air intake port 232B formed on this side face 232 into the air guide path 52. The sirocco fan 55 is used as an exit side cooling fan for sending cooling air to the air guide path 52 in which the exit side discharge openings 62G and 62B of the optical modulation systems 44G and 44B as the targets of independent cooling are formed.

Next, the operation of the above panel cooling device 50 will be described.

The cooling air introduced from the air intake port 231C by the sirocco fan 54 passes through the air guide path 51 and is discharged from the entrance side discharge openings 61G and 61B. The cooling air discharged from the entrance side discharge openings 61G and 61B cools the luminous flux entrance surfaces of the liquid crystal panels 441G and 441B, the viewing angle correction plates 443, and the entrance side polarization plates 442.

The cooling air introduced from the air intake port 232B by the sirocco fan 55 passes through the air guide path 52 and is discharged from the exit side discharge openings 62G and 62B and the discharge opening 61R. Of the air, the cooling air discharged from the exit side discharge openings 62G and 62B cools the luminous flux exit surfaces of the liquid crystal panels 441G and 441B and the exit side polarization plate 444. The air discharged from the discharge opening 61R cools the luminous flux entrance surface and the luminous flux exit surface of the liquid crystal panel 441R, the entrance side polarization plate 442, the viewing angle correction plate 443, and the exit side polarization plate 444.

The cooling air that has cooled the above optical components is collected by the exhaust sirocco fan, which is not shown, and exhausted from the exhaust port formed on the front face of the projector 1.

According to the embodiment, the following effects can be obtained. Since the construction in which the luminous flux entrance sides and the luminous flux exit sides of the liquid crystal panels 441G and 441B are cooled with cooling air that has passed through different paths, the wind speed and the air flow of the cooling air may be adjusted in response to the respective generated amounts of heat. Thereby, the luminous flux entrance sides and the luminous flux exit sides of the liquid crystal panels 441G and 441B can be cooled on more suitable conditions, respectively, compared to the case of applying cooling air from the same path, and thus, the optical modulation systems 44G and 44B can be cooled with high efficiency while realizing miniaturization and reduction of the mounted number of cooling fans.

Since the discharge opening 61R and the exit side discharge openings 62G and 62B are formed in the positions for cooling the liquid crystal panels 441R, 441G, and 441B and the exit side polarization plates 444, not only the liquid crystal panels 441R, 441G, and 441B, but also the exit side polarization plates 444 which generates a larger amount of heat can be cooled by the discharged cooling air, and thereby, cooling efficiency can be made better.

Since the discharge opening 61R with respect to the optical modulation system 44R other than the target of independent cooling is formed in the air guide path 52, the entrance side discharge opening and the exit side discharge opening can be provided in the same the air guide path 52, and thereby the structure of the duct 53 can be simplified.

Since the entrance side discharge opening 61G and the exit side discharge opening 62G are formed on the positions offset to the upstream side of the intersections of the extending direction of the optical modulation system 44G and the air guide paths 51 and 52, the cooling air from the discharge openings 61G and 62G can be assured to be in contact with the optical modulation system 44G, and thereby, the optical modulation system 44G can be cooled smoothly.

Since, normally, the exit side polarization plate 444 generates a larger amount of heat than the entrance side polarization plate 442, the sirocco fan 55 with higher cooling capability than the sirocco fan 54 is used, and thereby, the exit side polarization plate 444 and the entrance side polarization plate 442 can quickly be cooled, respectively.

Since the air intake ports 231C and 232B of the cooling fans 54 and 55 are formed on the two different faces of the exterior case 2, respectively, cooling air outside the projector 1 can be introduced into the optical modulation systems 44R, 44G, and 44B smoothly to further improve cooling efficiency.

As described above, the invention has been described by citing the preferable embodiment, however, it should be understood that the invention is not limited to the exemplary embodiment, and various improvements and design changes can be made without departing from the content of the invention.

For example, in the above embodiment, only the optical modulation systems 44G and 44B are set as the targets of independent cooling, however, not limited to that. That is, all of optical modulation systems 44R, 44G, and 44B may be set as the targets of independent cooling, or any one of these optical modulation systems 44R, 44G, and 44B may be set as the target of independent cooling.

Further, the size, performance, etc. of the sirocco fans 54 and 55 may be determined suitably according to the generated amounts of heat of the optical modulation systems 44R, 44G, and 44B.

What is claimed is:

1. A projector, comprising:

plural optical modulation systems that modulate plural color lights with respect to each color light according to image information to form optical images;

each of said optical modulation systems further including an optical modulation device, an entrance side optical conversion element disposed on a luminous flux entrance side of the optical modulation device, and an exit side optical conversion element disposed on a luminous flux exit side of said optical modulation device;

a color composition optical system that combines the optical images modulated in the respective optical modulation systems;

a projection optical system that magnifies projection of the composite optical image, and that introduces cooling air to said optical modulation systems; and a duct having plural air guide paths through which cooling air passes, entrance side discharge openings that discharge cooling air to the luminous flux entrance sides of said optical modulation devices, and/or exit side discharge openings that discharge cooling air to the luminous flux exit sides of said optical modulation devices, which are formed in these air guide paths, the luminous flux entrance side and the luminous flux exit side of at least one of said plural optical modulation systems being set as a target of independent cooling, and said entrance side discharge opening and said exit side discharge opening with respect to the target of independent cooling being formed in different air guide paths, and the cooling air is sent to the luminous flux exit side by an exit side cooling fan and is sent to the luminous flux entrance side by an entrance side cooling fan.

2. The projector according to claim 1, further comprising an exterior housing that accommodates said optical modulation systems, said color composition optical system, and said projection optical system, a number of said cooling fans being set to two, and air intake ports of these cooling fans being formed on two different surfaces of said exterior housing.

3. The projector according to claim 1, said exit side discharge opening being formed in a position that cools said optical modulation device and said exit side optical conversion element.

4. The projector according to claim 1, said entrance said discharge opening and said exit discharge opening with respect to at least one of optical modulation systems other than said target of independent cooling being formed in a same air guide path.

5. The projector according to claim 1, an extending direction of said optical modulation system being disposed substantially orthogonal to an extending direction of said air guide path, and at least one of said respective discharde openings being formed on a plane along an extending direction of said air guide path in a position offset to an upstream side of an intersection of the extending direction of the optical modulation system and the air guide path so that said optical modulation system may be located in a discharge direction of cooling air from the discharge opening.

6. The projector according to claim 1, the exit side cooling fan that sends the cooling air to the air guide path in which said exit side discharge opening of the target of independent cooling is formed sending a larger amount of air than that of the entrance side cooling fan for sending cooling air to the air guide path in which said entrance side discharge opening of the target of independent cooling is formed.

* * * * *